United States Patent
Chang et al.

(10) Patent No.: US 8,358,749 B2
(45) Date of Patent: Jan. 22, 2013

(54) SYSTEM AND METHOD TO SEARCH A MEDIA CONTENT DATABASE BASED ON VOICE INPUT DATA

(75) Inventors: Hisao Chang, Cedar Park, TX (US);
Dale Malik, Dunwoody, GA (US);
Linda Roberts, Decatur, GA (US);
Horst Schroeter, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 480 days.

(21) Appl. No.: 12/623,379

(22) Filed: Nov. 21, 2009

(65) Prior Publication Data

US 2011/0123004 A1 May 26, 2011

(51) Int. Cl.
*H04M 1/64* (2006.01)
*H04M 3/42* (2006.01)
*H04N 7/173* (2011.01)

(52) U.S. Cl. ............... 379/88.04; 379/210.01; 725/110
(58) Field of Classification Search .......... 379/210.01, 379/88.01–88.25; 725/98, 58, 110, 25, 62, 725/114; 704/251, 275; 370/352
See application file for complete search history.

(56) References Cited

U.S. PATENT DOCUMENTS

| | | | |
|---|---|---|---|
| 7,624,417 B2 * | 11/2009 | Dua | 725/114 |
| 2003/0070174 A1 * | 4/2003 | Solomon | 725/98 |
| 2007/0074240 A1 * | 3/2007 | Addington et al. | 725/25 |
| 2007/0107016 A1 * | 5/2007 | Angel et al. | 725/61 |
| 2007/0107017 A1 * | 5/2007 | Angel et al. | 725/62 |
| 2007/0220565 A1 * | 9/2007 | Angel et al. | 725/87 |
| 2007/0242659 A1 * | 10/2007 | Cantu et al. | 370/352 |
| 2008/0239167 A1 * | 10/2008 | Goldberg | 348/734 |
| 2009/0110172 A1 * | 4/2009 | Unmehopa et al. | 379/210.01 |
| 2010/0071007 A1 * | 3/2010 | Meijer | 725/58 |
| 2010/0095337 A1 * | 4/2010 | Dua | 725/110 |
| 2010/0318357 A1 * | 12/2010 | Istvan et al. | 704/251 |

* cited by examiner

*Primary Examiner* — Mohammad Islam
(74) *Attorney, Agent, or Firm* — Toler Law Group, PC

(57) ABSTRACT

A computer implemented method includes initiating a call from an interactive voice response (IVR) system to a first device associated with a user in response to a user request. The computer implemented method includes receiving voice input data at the IVR system via the call. The computer implemented method also includes performing a search of a media content database based at least partially on the voice input data. The computer implemented method further includes sending search results identifying media content items based on the search of the media content database to a second device associated with the user.

20 Claims, 6 Drawing Sheets

SYSTEM AND METHOD TO SEARCH A MEDIA CONTENT DATABASE BASED ON VOICE INPUT DATA

FIELD OF THE DISCLOSURE

The present disclosure is generally related to searching a media content database based on voice input data.

BACKGROUND

Media content service providers may enable subscribers to view scheduled media content programs via an Electronic Program Guide (EPG). Media content service providers may provide subscribers with the ability to search the EPG. For example, a service provider may enable a subscriber to specify search criteria by selecting individual alphanumeric characters of a keyboard displayed at a display device. However, entering search criteria by selecting individual alphanumeric characters of a keyboard displayed at a display device may be slow, cumbersome, and prone to entry errors, particularly for longer search criteria.

DETAILED DESCRIPTION

An interactive voice response (IVR) system initiates a call to a first device associated with a user in response to a user request. Voice input data is received at the IVR system via the call. A search of a media content database is performed based at least partially on the voice input data. Search results identifying media content items based on the search of the media content database are sent to a second device associated with the user.

In a particular embodiment, a computer implemented method includes initiating a call from an interactive voice response (IVR) system to a first device associated with a user in response to a user request. The computer implemented method includes receiving voice input data at the IVR system via the call. The computer implemented method also includes performing a search of a media content database based at least partially on the voice input data. The computer implemented method further includes sending search results identifying media content items based on the search of the media content database to a second device associated with the user.

In another particular embodiment, a system includes an interactive voice response (IVR) system. The IVR system includes a processor to process voice input data received from a user via a call from a first device associated with the user and to determine search terms for a search of a media content database based on the voice input data. The system includes a search engine to perform the search of the media content database based at least partially on the search terms. The system also includes an output interface to send information to a second device associated with the user identifying at least one media content item identified via the search.

In another particular embodiment, an interactive voice response (IVR) system includes a processor and a computer-readable storage medium including operational instructions that, when executed by the processor, cause the processor to receive a request from a user via a voice telephony call to initiate a search of a media content database. The operational instructions, when further executed by the processor, cause the processor to initiate the search of the media content database in response to receiving the request. The operational instructions, when further executed by the processor, cause the processor to identify a set-top box device associated with the user. The operational instructions, when further executed by the processor, cause the processor to send search results identifying media content items based on the search of the media content database to the set-top box device associated with the user.

Figure 1:
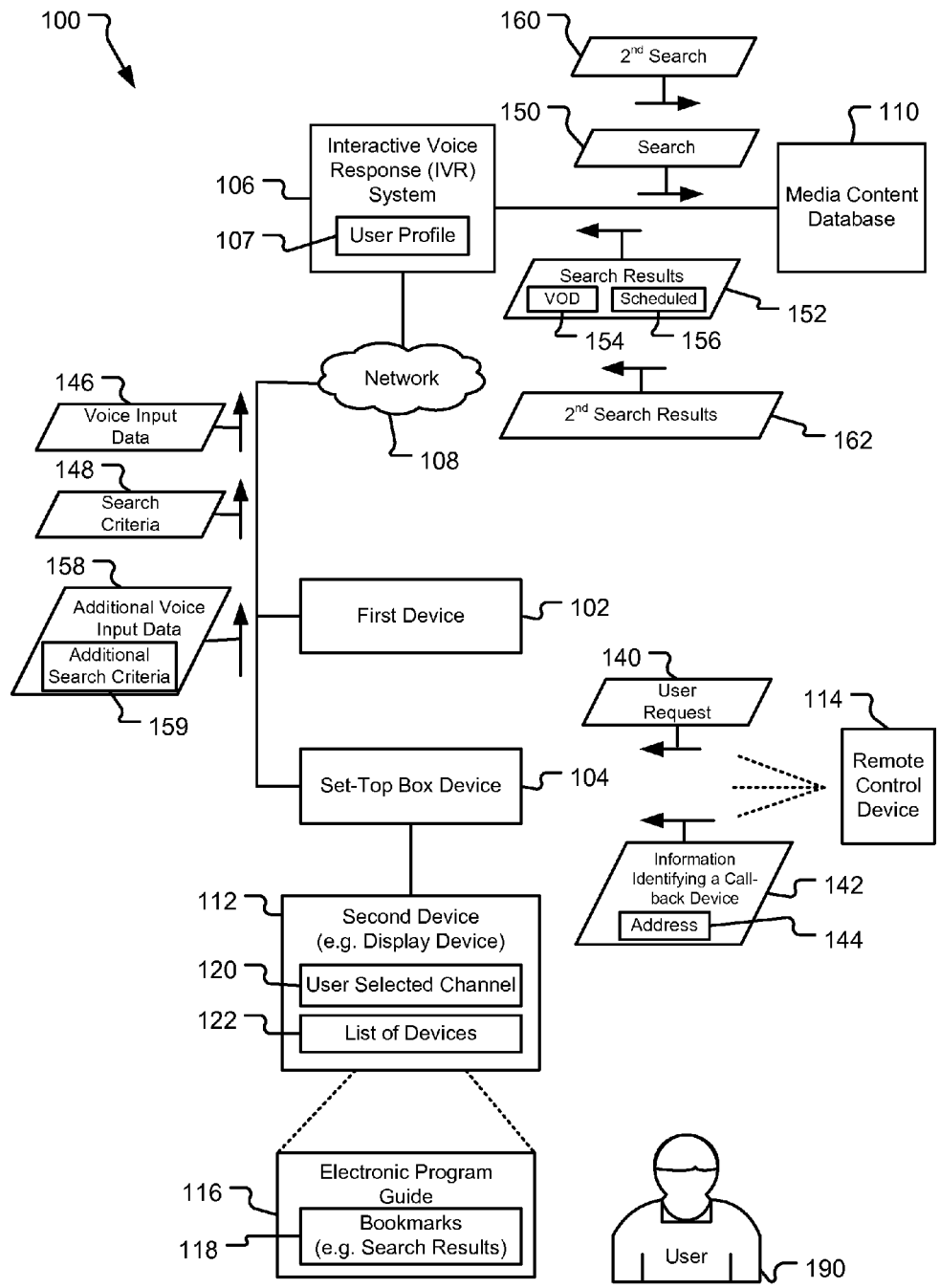
FIG. 1 is a block diagram of a first particular embodiment of a system to search a media content database based on voice input data.

Referring to FIG. 1, a block diagram of a first particular embodiment of a system to search a media content database based on voice input data is depicted and generally designated 100. The system 100 includes a first device 102 and a set-top box device 104 coupled to an interactive voice response (IVR) system 106 via a network 108. A media content database 110 is coupled to the IVR system 106. A second device 112 (e.g. a display device) is coupled to the set-top box device 104.

The first device 102 may be a voice telephony device (e.g. a landline telephone device or a mobile telephone device), a computing device, or any combination thereof. The first device 102 may be used to initiate or terminate a voice telephony call via the network 108 or via another communications network.

The set-top box device 104 may receive media content from a media content server via the network 108. The set-top box device 104 may send the media content for display to the second device 112. A user 190 may interact with the set-top box device 104 using a remote control device 114.

The media content database 110 may include information associated with scheduled media content, on-demand media content, another type of media content, or any combination thereof. The media content database 110 may be searchable using different search criteria 148 to identify particular media content that meet the search criteria 148. For example, the search criteria 148 may include a genre (e.g., action, drama, adventure, comedy, science fiction, etc.), an actor/actress, a director, an award (e.g., Academy Award), a release date, a title, a channel, a time interval (e.g., released between 1985 and 1987), or any combination thereof.

The IVR system 106 may receive voice input data 146 from the user 190. The voice input data 146 may be received via a call between the IVR system 106 and the first device 102. The IVR system 106 may extract data, such as the voice input data 146, from the call using natural language speech recognition, voice-to-text conversion, another speech recognition system, or any combination thereof. The IVR system 106 may initiate a search 150 of the media content database 110 based on the voice input data 146. The IVR system 106 may send search results 152 to the set-top box device 104 for display at the second device 112.

In operation, the user 190 may send a user request 140 from the set-top box device 104 to the IVR system 106. For example, the user 190 may use the remote control 114 to interact with the set-top box device 104 to send the user request 140. The user 190 may also send information identifying a call back device 142 to the IVR system 106. The information identifying the call back device 142 may include an address 144 of the call back device 142. For example, the address 144 may be a telephone number associated with the first device 102. The information identifying the call back device 142 may be received by a selection from a list of devices 122 displayed at the second device 112. The list of devices 122 may include devices associated with the user 190. For example, the list of devices 122 may include a mobile phone device associated with the user 190 and the first device 102 associated with the user 190. In response to receiving the user request 140, the IVR system 106 may initiate a call to the call back device specified by the address 144. For example, when the address 144 specifies an address associated with the first device 102, the IVR system 106 may initiate a call to the first device 102.

The IVR system 106 may receive the voice input data 146 via the call to the first device 102. In a particular embodiment, the IVR system 106 may prompt the user 190 to enter the search criteria 148 based on a user profile 107. For example, when the user profile 107 indicates that the user 190 prefers to view media content items having a particular genre XYZ, the IVR system 106 may prompt the user 190 by asking, "Do you wish to view additional media content from the XYZ genre?" and thereby receive additional search criteria 148. For example, the voice input data 146 may specify "Find media content having an action genre starring actor ABC." The IVR system 106 may perform the search 150 of the media content database 110 based at least partially on the voice input data 146, the search criteria 148, the user profile 107, or any combination thereof. The IVR system 106 may send the search results 152 based on the search 150 of the media content database 110 to the second device 112 associated with the user 190. For example, the search results 152 may identify video on demand (VOD) 154 media content items and scheduled 156 media content items. The search results 152 may be received by the second device 112 and displayed as bookmarks 118 in an electronic program guide 116.

After sending the search results 152, the IVR system 106 may receive additional voice input data 158 (e.g. via the call) where the additional voice input data 158 specifies additional search criteria 159. For example, when the search criteria 148 are very broad and result in the search results 152 including a large number of media content items, the IVR system 106 may prompt the user 190 to input the additional voice input data 158. For example, the IVR system 106 may play a message "The search has found more than twenty items. Do you wish to provide additional search criteria to refine the search?" The IVR system 106 may perform a second search 160 based on the additional voice input data 158. The IVR system 106 may send second search results 162 to the second device 112 based on the second search 160.

In a particular embodiment, a user selected channel 120 may be displayed at the second device 112 while the search 150 or the second search 160 is being performed by the IVR system 106. For example, the user 190 may select and view the user selected channel 120 until the search results 152 or the second search results 162 are received at the set-top box device 104 for display at the second device 112, or until the user 190 selects to view the search results 162 in the electronic program guide 116.

Thus, the user 190 does not have to spend time scrolling through a list of programs displayed by the electronic program guide 116 at the second device 112 to identify media content items of interest to the user 190. The user 190 does not have to use an alphanumeric keyboard displayed at the second device 112 to input the search criteria 148 to identify media content items of interest to the user 190. Instead, the user 190 may send the user request 140 to the IVR system 106 and may send the information identifying the call back device 142 to the IVR system 106. The IVR system 106 may initiate a call to the device specified in the information identifying the call back device 142. The user 190 may enter voice input data 146 to initiate the search 150 of the media content database 110 and receive the search results 152 as bookmarks 118 in the electronic program guide 116.

Figure 2:
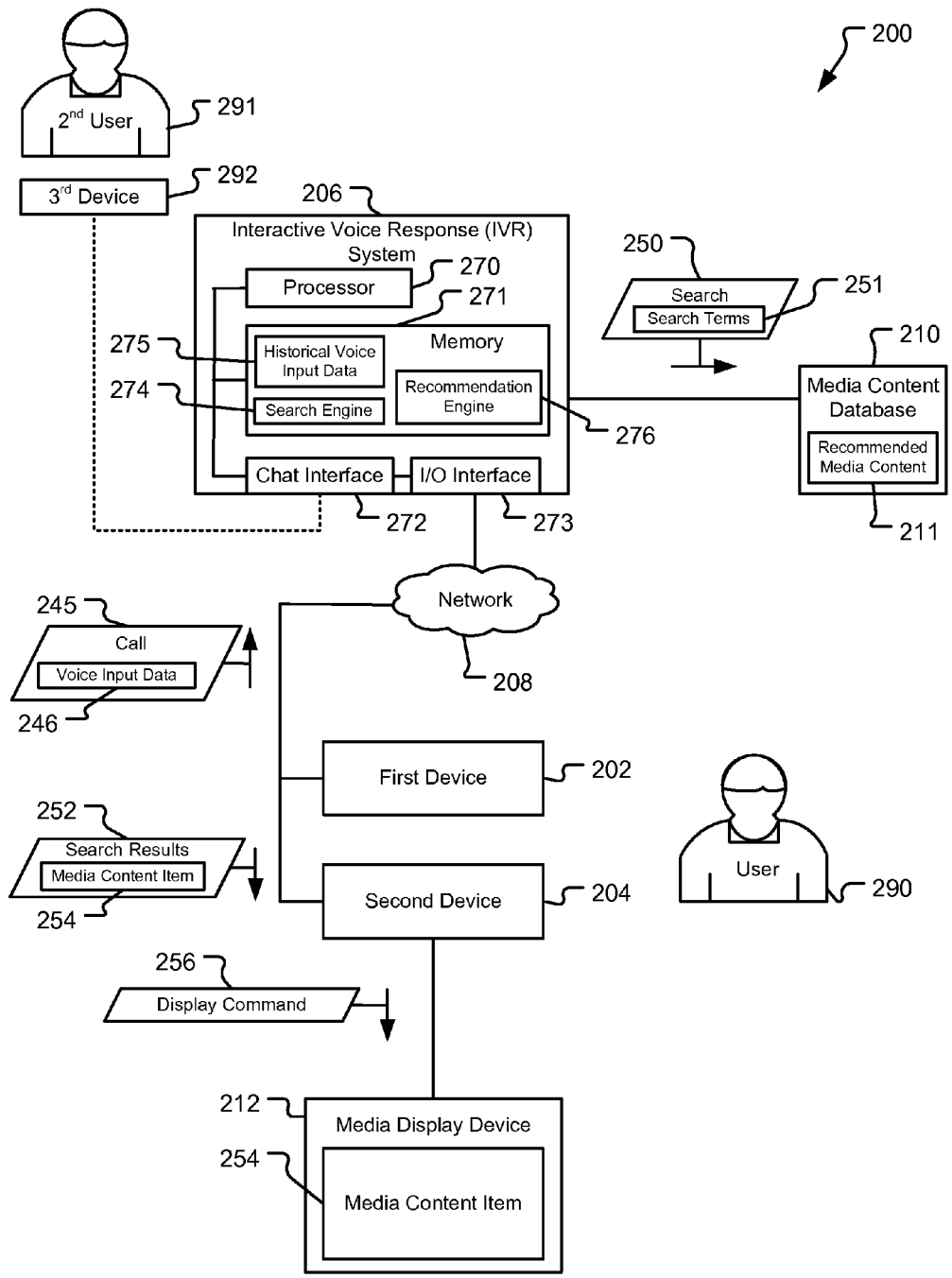
FIG. 2 is a block diagram of a second particular embodiment of a system to search a media content database based on voice input data.

Referring to FIG. 2, a block diagram of a second particular embodiment of a system to search a media content database based on voice input data is depicted and generally designated 200. In the system 200, a first device 202 and a second device 204 are coupled to an interactive voice response (IVR) system 206 via a network 208. A media content database 210 is coupled to the IVR system 206. A media display device 212 is coupled to the second device 204.

The devices 202-204 may be voice telephony devices, computing devices, set-top box devices, other computing devices, or any combination thereof. For example, when the first device 102 is a voice telephony device, the first device 102 may be used to initiate or terminate a voice telephony call via the network 208 or via another network (e.g. a mobile communications network). When the second device 204 is a set-top box device, the second device 204 may receive media content from a media content server via the network 108. The second device 204 may send the media content for display to the media display device 212. The devices 202-204 may be associated with a user 290.

The media content database 210 may include information associated with scheduled media content, on-demand media content, another type of media content, or any combination thereof. The media content database 210 may be searchable using different search criteria to identify particular media content that meet the search criteria. For example, the search criteria may include a genre (e.g., action, drama, adventure, comedy, science fiction, etc.), an actor/actress, a director, an award (e.g., Academy Award), a release date, a title, a channel, a time interval (e.g., released between 1985 and 1987), or any combination thereof.

The IVR system 206 may receive voice input data 246 from the user 290. The voice input data 246 may be received via a call 245 from the first device 202 to the IVR system 206. The IVR system 206 may initiate a search 250 of the media content database 210 based on the voice input data 246. The IVR system 106 may send search results 252 to the second device 204 for display at the media display device 212. The IVR system 206 includes a processor 270, a memory 271, a chat interface 272, and an Input/Output (I/O) interface 273. The memory 271 includes a search engine 274, historical voice input data 275, and a recommendation engine 276. A third device 292 associated with a second user 291 may be coupled to the chat interface 272.

In operation, the user 290 may use the first device 202 to initiate the call 245 to the IVR system 206. The processor 270 of the IVR system 206 may process the voice input data 246 received via the call 245 and determine search terms 251. The processor 270 may instruct the search engine 274 to perform the search 250 of the media content database 210 based at least partially on the search terms 251. The I/O interface 273 may send the search results 252 to the second device 204 associated with the user 290. The search results 252 may identify at least one media content item 254 identified via the search 250.

In a particular embodiment, the recommendation engine 276 may access the historical voice input data 275 associated with the user. The recommendation engine 276 may identify recommended media content 211 based on the historical voice input data 275. The voice input data 246 may include a request that the recommendation engine 276 access the historical voice input data 275 to identify the recommended media content 211 via the search 250. For example, the voice input data 246 may specify "Please recommend media content items based on the last five movies I have watched."

The chat interface 272 may enable the user 290 to chat with at least the second user 291. For example, when the user 290 initiates the call 245 to the IVR system 206, the IVR system 206 may invite the user 290 to join in a chat session based on the historical voice input data 275. For example, the historical voice input data 275 may indicate that the user 290 has searched for media content items starring actor XYZ. The chat interface 272 may determine that the second user 291 is interested in chatting about media content items starring actor XYZ and invite the first user 290 to chat with the second user 291.

When the IVR system 206 identifies only one recommended media content item 211 via the search 250, the IVR system 206 may send a display command 256 from the I/O interface 273 to the media display device 212. The display command 256 may instruct the media display device 212 to display the one media content item 254. To illustrate, when a recommend media content item 211 is identified via the search 250, instead of displaying the media content item 211 as a bookmark of an electronic program guide at the media display device 212, the content of the media content item 254 is displayed at the media display device 212.

The user 290 does not have to scroll through a large electronic program guide to identify media content item of interest to the user 290. The user 290 does not have to use an alphanumeric keyboard displayed at the media display device 212 to input search criteria to identify media content items of interest to the user 190. Instead, the user 290 can initiate a call to the IVR system 206 and perform a search of the media content database 210 to identify recommended media content items 211. The user 290 can also chat with other users, such as the second user 291.

Figure 3:
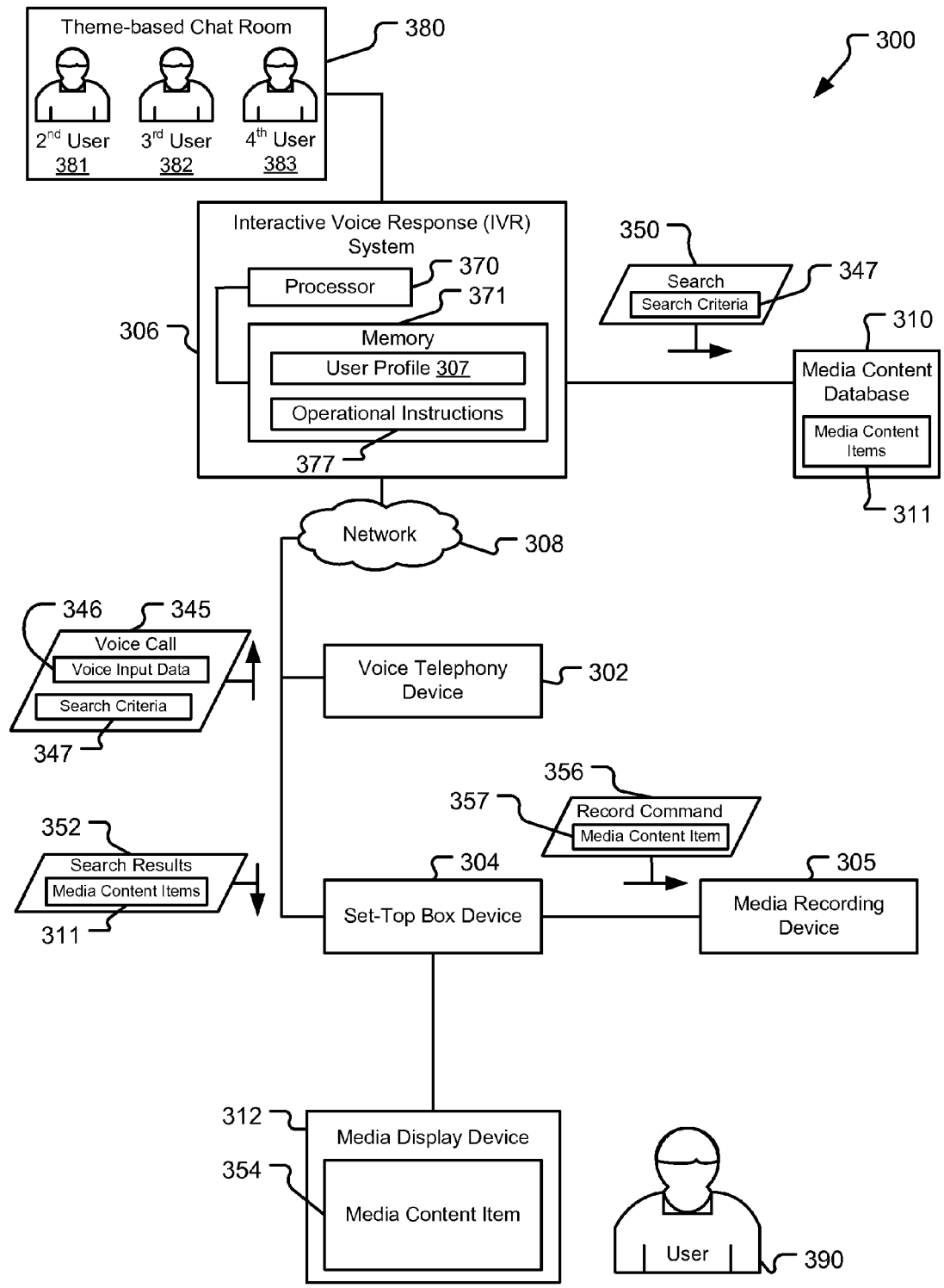
FIG. 3 is a block diagram of a third particular embodiment of a system to search a media content database based on voice input data.

Referring to FIG. 3, a block diagram of a system to search a media content database based on voice input data is depicted and generally designated 300. The system 300 includes a voice telephony device 302 and a set-top box 304 coupled to an interactive voice response (IVR) system 306 via a network 308. A media content database 310 is coupled to the IVR system 306. A media recording device 305 and a media display device 312 are coupled to the set-top box device 304.

The voice telephony device 302 may be used to initiate or receive voice telephony calls via the network 308 or via another communications network. For example, the voice telephony device 302 may be used to initiate or receive a call to the IVR system 306.

The set-top box device 304 may receive media content from a media content server via the network 308. The set-top box device 304 may send the media content for display to the media display device 312. The set-top box device 304 may instruct the media recording device 305 to record the media content. In a particular embodiment, the media recording device 305 may be integrated with the set-top box device 304.

The media content database 310 may include information associated with scheduled media content, on-demand media content, another type of media content, or any combination thereof. The media content database 310 may be searchable using different search criteria to identify particular media content that meet the search criteria. For example, the search criteria may include a genre (e.g., action, drama, adventure, comedy, science fiction, etc.), an actor/actress, a director, an award (e.g., Academy Award), a release date, a title, a channel, a time interval (e.g., released between 1985 and 1987), or any combination thereof.

The IVR system 306 may receive voice input data 346 from the user 390. The voice input data 346 may be received via a voice call 345 between the IVR system 306 and the voice telephony device 302. In a particular embodiment, the user 390 may initiate the voice call 345 to the interactive voice into the IVR system 306. In another particular embodiment, the user 390 may send a request asking the IVR system 306 to initiate the voice call 345 to the voice telephony device 302 associated with the user 390. The IVR system 306 may initiate a search 350 of the media content database 310 based on the voice input data 346. The IVR system 306 may send search results 352 to the set-top box device 304 for display at the media display device 312. The IVR system 306 includes a processor 370 and a memory 371. The memory 371 includes a user profile 307 and operational instruction 377. The operational instructions 377 may be executable by the processor 370 to perform the various functions of the IVR system 306.

In operation, the IVR system 306 may receive the voice input data 346 via the voice call 345. In a particular embodiment, search criteria 347 may be received via the voice call 345. In another particular embodiment, the search criteria 347 may be determined based on the user profile 307. The search criteria 347 may include at least one of a genre, an actor, a director, an award, a release date, a title, a channel, and a time interval. The IVR system 306 may perform the search 350 based on the search criteria 347. The IVR system 306 may send the search results 352 to a device associated with the user 390 (e.g. the set-top box device 304, the media recording device 305, or the media display device 312).

The IVR system 306 may identify the set-top box device 304 as a device associated with the user 390. For example, the IVR system 306 may identify an address associated with the voice telephony device 302 and match the address to a user account associated with the set-top box device 304. In another example, the IVR system 306 may access the user profile 307 to identify the set-top box device 304. The IVR system 306 may send the search results 352 including media content items 311 to the set-top box device 304. Based on the voice input data 346, the IVR system 306 may send the record command 357 to the media recording device 305 to initiate or schedule recording of a particular media content item 357 identified by the search 350.

The IVR system 306 may enable the user 390 to communicate with one or more users in a theme-based chat room 380. For example, the user 390 may communicate with a second user 381, a third user 382, and a fourth user 383 at the theme-based chat room 380. The theme-based chat room 380 may be based on a particular theme such as a genre, an actor, a director, an award, or other theme related to media content. The IVR system 306 may provide multiple theme-based chat rooms and keep track of the discussions occurring in each theme-based chat room. For example, the IVR system 306 may store a record of the discussion at each theme-based chat room 380 that includes information such as which movies, shows, sporting events, and other media content items are considered "hot" or "cool" to watch based on the amount of discussion associated with a particular media content item. To illustrate, the IVR system 306 may identify a media content item that is most frequently mentioned in the theme-based chat room 380 as a "hot" item. When the user 390 is added to the chat room 380, the IVR system 306 may provide an option to the caller to provide a quick recap of media content items associated with the hottest chats in a particular time period (e.g., last half-hour, morning, afternoon, evening, today, current week). When the user 390 wants to view a particular media content item on the hot-chat list provided by the IVR system 306, the user 390 can ask the IVR system 306 to (1) send a channel-change request to the set-top box device 304 (e.g. when a show is being broadcast) to display the particular media content item, (2) place the media content item in a bookmark of an electronic program guide, (3) instruct the media recording device 305 to record the particular media content item for later viewing, or any combination thereof. When the user 390 initiates the voice call 345 to the IVR system 306, the IVR system 306 may ask the user 390 whether the user 390 desires to hear a chat room summary identifying at least one active theme-based chat room. For example, active theme-based chat rooms may include all theme-based chat rooms having more than a predetermined threshold of active users. After the user 390 joins a theme-based chat room, such as the theme-based chat room 380, the IVR system 306 may provide the user 390 with information identifying the media content items 311 associated with the discussions occurring at the theme-based chat room 380. For example, when the user 390 joins the theme-based chat room 380 having a "College Football" theme, the IVR system 306 may determine that the discussions at the theme-based chat room 380 are about a game between a first university and a second university. The IVR system 306 may ask the user 390 whether the user 390 desires the IVR system 306 to identify media content items associated with the current discussion at the theme-based chat room 380. In response to voice input data 346, the IVR system 306 may perform a search 350 and include the first university and the second university in search criteria 347 for the search 350. The IVR system 306 may send search results 352 identifying the media content items 311 related to the search 350.

When one of the media content items 311 is capable of being displayed, the media content item 354 may display the media content item 354 at the media display device 312. For example, when the media content items 311 include a game currently being played between the first university and the second university (e.g., media content item 354), the media content item 354 may be displayed at the media display device 312. When the media content items 311 are scheduled to occur in the future, the search results 352 may be displayed as bookmarks in an electronic program guide, as described in FIG. 1. When the voice input data 346 identifies at least one of the media content items 311 (e.g., the media content item 357) for recording at the media recording device 305, the IVR system 306 may send the record command 356 to the media recording device 305 to record at least the media content item 357 at the media recording device 305. Thus, when the user 390 joins the theme-based chat room 380, the IVR system 306 may identify the media content items 311 associated with discussions occurring at the theme-based chat room 380 and send the media content items 311 to the set-top box device 304. The voice input data 346 may cause at least one of the media content items 311, such as the media content item 354, to be displayed at the media display device 312. The voice input data 346 may cause at least one of the media content items 311, such as the media content item 357, to be recorded at the media recording device 305.

Thus, the user 390 does not have to spend time scrolling through a list of programs displayed by an electronic program guide at the media display device 312 to identify media content items of interest to the user 390. The user 390 does not have to use an alphanumeric keyboard displayed at the media display device 312 to input search criteria to identify media content items of interest to the user 390. Instead, the user 390 may provide voice input data 346 and search criteria 347 via the voice call 345 between the IVR system 306 and the voice telephony device 302. The IVR system 306 may perform the search 350 of the media content database 310 and send the search results 352 to the set-top box device 304 for display at the media display device 312.

Figure 4:
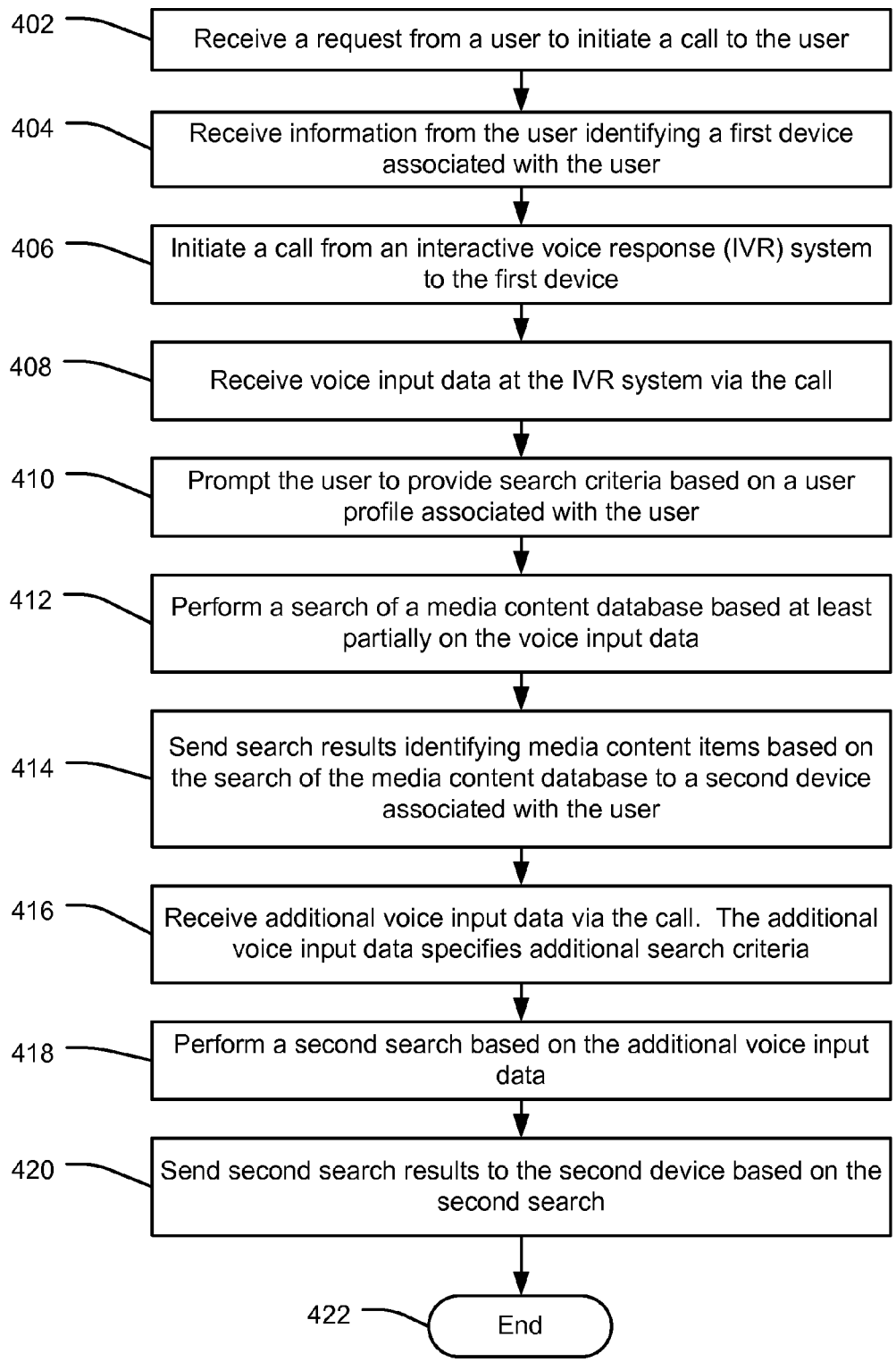
FIG. 4 is a flow diagram of a first particular embodiment of a method to search a media content database based on voice input data.

FIG. 4 is a flow diagram of a first particular embodiment of a method to search a media content database based on voice input data. The method may be performed by an interactive voice response (IVR) system, such as the IVR system 106 of FIG. 1, the IVR system 206 of FIG. 2, or the IVR system 306 of FIG. 3.

A request is received from a user to initiate a call to the user, at 402. Moving to 404, information may be received from the user identifying a first device associated with the user. Advancing to 406, a call is initiated from an IVR system to the first device. Proceeding to 408, voice input data is received at the IVR system via the call. For example, in FIG. 1, the user 190 may use the remote control device 114 to send the user request 140 to the IVR system 106. The IVR system 106 may initiate a call to the first device 102 and receive the voice input data 146.

Continuing to 410, the user may be prompted to provide search criteria based on a user profile associated with the user. Moving to 412, a search of a media content database is performed based at least partially on the voice input data. Advancing to 414, search results identifying media content items based on the search of the media content database are sent to a second device associated with the user. For example, in FIG. 1, the IVR system 106 may perform the search 150 of the media content database 110 and send the search results 152 to the set-top box device 104. The set-top box device 104 may display the search results 152 as the bookmarks 118 in the electronic program guide 116 display at the second device 112.

Proceeding to 416, additional voice input data may be received via the call. The additional voice input data may specify additional search criteria. Advancing to 418, a second search may be performed based on the additional voice input data. Proceeding to 420, second search results may be sent to the second device based on the second search. For example, in FIG. 1, the additional voice input data 158 may be received by the IVR system 106. The IVR system 106 may perform the second search 160 based on the additional voice input data 158 and send the second search results 162 to the set-top box device 104. The method ends at 422.

Thus, a user can search for media content by inputting voice input data via a voice call initiated by an IVR system to a voice telephony device associated with the user. The search results may be sent to a set-top box device for display at a media display device as bookmarks in an electronic program guide.

Figure 5:
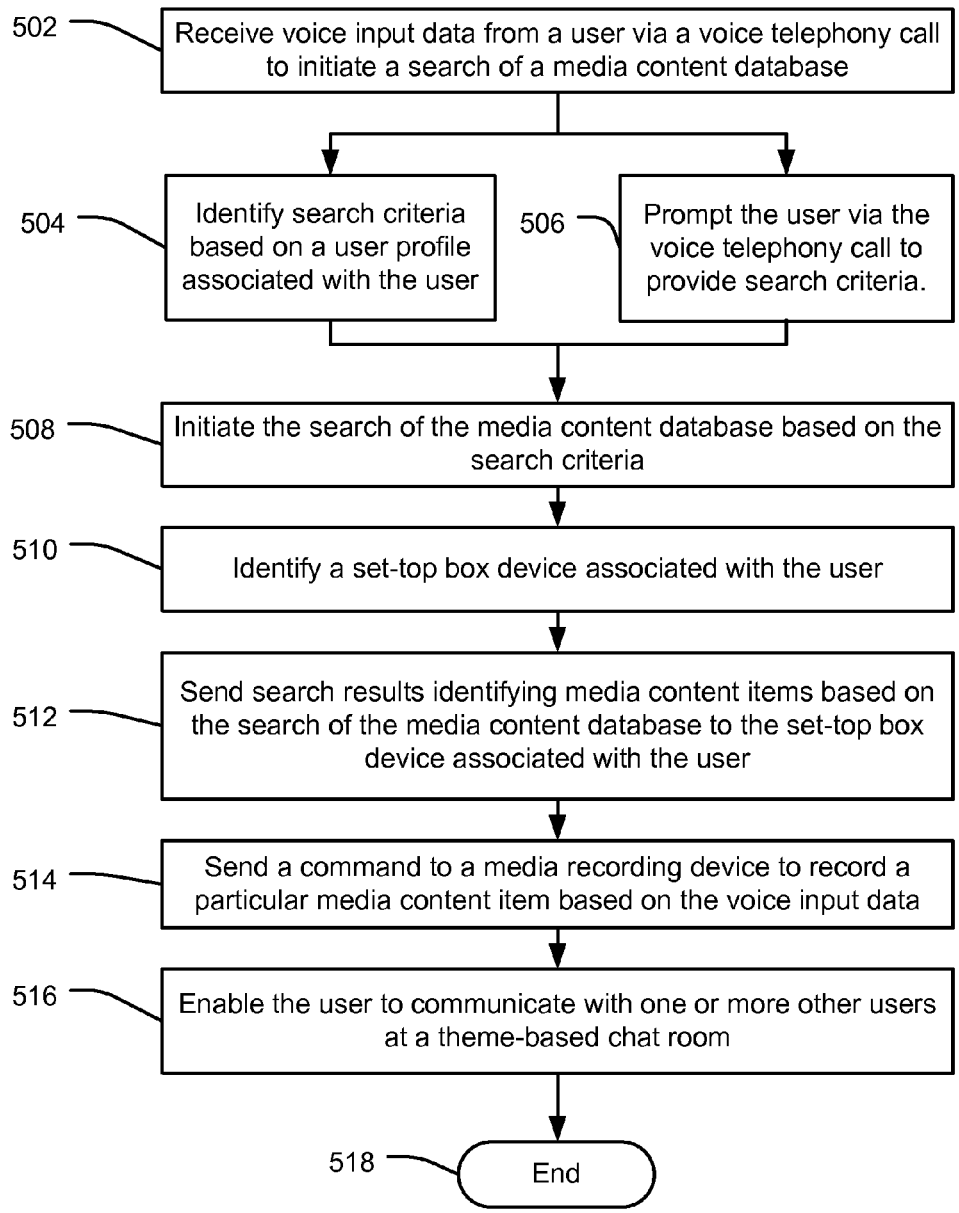
FIG. 5 is a flow diagram of a second particular embodiment of a method to search a media content database based on voice input data.

FIG. 5 is a flow diagram of a second particular embodiment of a method to search a media content database based on voice input data. The method may be performed by an interactive voice response (IVR) system such as the IVR system 106 of FIG. 1, the IVR system 206 of FIG. 2, or the IVR system 306 of FIG. 3.

Voice input data to initiate a search of a media content database is received from a user via a voice telephony call, at

502. At 504, search criteria may be identified based on a user profile associated with the user. At 506, a user may be prompted to provide search criteria via the voice telephony call. For example, in FIG. 3, the search criteria 347 may be identified via the voice call 345 or by accessing the user profile 307.

Moving to 508, a search of a media content database is initiated based on the search criteria. Advancing to 510, a set-top box device associated with the user is identified. For example, in FIG. 3, the set-top box device 304 may be automatically identified based on the voice input data 346, based on an address of the voice telephony device 302, based on the user profile 307, or any combination thereof. Proceeding to 512, search results identifying media content items based on the search of the media content database are sent to the set-top box associated with the user. For example, in FIG. 3, the IVR system 306 may perform the search 350 and send search results 352 to the set-top box device 304. Advancing to 514, a command may be sent to a media recording device to record a particular media content item based on the voice input data. Continuing to 516, the user may be enabled to communicate with one or more users at a theme-based chat room. The method ends at 518.

Thus, a user can search for media content by inputting voice input data via a voice call between an IVR system and a voice telephony device associated with the user. The search results may be automatically scheduled for recording at a media recording device or sent to a set-top box device for display at a media display device as bookmarks in an electronic program guide. The user may also chat with other users at a theme-based chat room.

Figure 6:
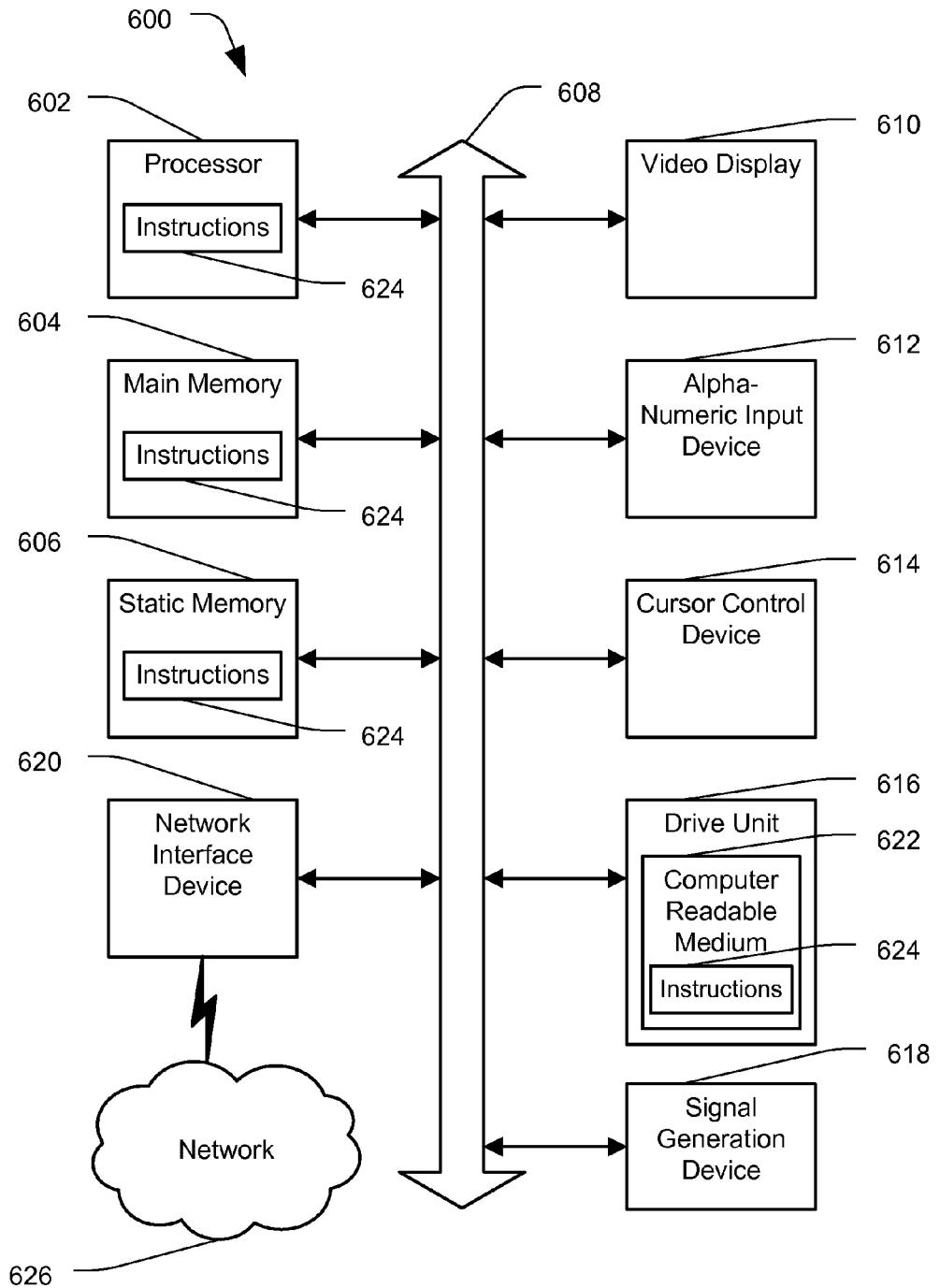
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices. The computer system 600 may include or be included within any one or more of the first device 102 of FIG. 1, the second device 104 of FIG. 1, the IVR system 106 of FIG. 1, the first device of 202 of FIG. 2, the second device 204 of FIG. 2, the media display device 204, the IVR system 206 of FIG. 2, the voice telephony device 302 of FIG. 3, the set-top box device 304 of FIG. 3, the media recording device 305 of FIG. 3, the media display device 312 of FIG. 3, the IVR system of FIG. 3, or any combination thereof.

In a networked deployment, the computer system 600 may operate in the capacity of a telephony device, a set-top box device, a media recording device, a display device, an interactive voice response system, a computing device, or any combination thereof, as described above with reference to FIGS. 1-3. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid-state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable storage medium that includes instructions 624 to enable a device connected to a network 626 to communicate voice, video or data over the network 626. Further, the instructions 624 may be transmitted or received over the network 626 via the network interface device 620.

While the computer-readable storage medium is shown to be a single medium, the term "computer-readable storage medium" includes a single medium or multiple media, such as a centralized or distributed database, and/or associated caches and servers that store one or more sets of instructions. The term "computer-readable storage medium" shall also include any tangible storage medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, VoIP, IPTV, MPEG, SMPTE, ATM, IEEE 802.11, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
receiving, from a remote control device via a media device, a request that media content criteria be obtained from a call-back device via an interactive voice response system, the request including identification information associated with the call-back device;
initiating a call to the call-back device via the interactive voice response system in response to the request;
receiving voice input data via the interactive voice response system, the voice input data received from the call-back device during the initiated call, wherein the voice input data includes the media content criteria;
sending a query to a media content database to identify one or more media content items based at least partially on the media content criteria of the voice input data; and
sending information associated with the one or more media content items to the media device.

2. The method of claim 1, wherein the call is initiated using an address included in the identification information.

3. The implemented method of claim 1, wherein the call-back device is a landline telephone device or a mobile telephone device.

4. The computer implemented method of claim 1, wherein the call-back device is a computing device.

5. The method of claim 4, wherein the media device determines the identification information based on a selection of a particular device identifier associated with the call-back device from a list of device identifiers, the selection received from the remote control device.

6. The method of claim 5, wherein each of the list of device identifiers is associated with a mobile device, a computing device, a landline telephone device, or a mobile telephone device.

7. The method of claim 1, further comprising sending one or more voice prompts to the call-back device via the interactive voice response system, wherein the one or more voice prompts are based in part on a user profile associated with a user of the call-back device, the one or more voice prompts requesting a user of the call-back device to provide the voice input data.

8. The method of claim 1, further comprising:
after sending the information associated with the one or more media content items, receiving additional voice input data via the interactive voice response system, the additional voice input data received from the call-back device during the call, wherein the additional voice input data includes additional media content criteria;
sending a second query to the media content database to identify one or more second media content items based at least partially on the additional media content criteria of the additional voice input data; and
sending additional information associated with the one or more second media content items to the media device.

9. The method of claim 1, wherein the one or more media content items include video-on-demand content items and scheduled media content items.

10. The comp method of claim 1, wherein the media device is a set-top box device.

11. A system comprising:
a processor; and
a memory accessible to the processor, the memory including operational instructions that, when executed by the processor, cause the processor to perform a method comprising:
receiving, from a remote control device via a computing device, a request that media content criteria be obtained from a call-back device via an interactive voice response system, the request including identification information associated with the call-back device;
initiating a call to the call-back device via the interactive voice response system in response to the request;
receiving voice input data via the interactive voice response system, the voice input data received from the call-back device during the initiated call, wherein the voice input data includes the media content criteria;
sending a query to a media content database to identify one or more media content items based at least partially on the media content criteria of the voice input data; and
sending information associated with the one or more media content items to the computing device.

12. The system of claim 11, wherein the information associated with the one or more media content items is inserted as one or more bookmarks within an electronic program guide.

13. The system of claim 11, wherein the method further comprises:
determining one or more recommended media content items based on historical voice input data received from the call-back device during a prior call; and
sending additional information associated with the one or more recommended media content items to the computing device.

14. The system of claim 11, wherein the method further comprises establishing an interactive session between the call-back device and a remote device to enable a user associated with the call-back device to communicate, via the interactive session, with a second user associated with the remote device during the call.

15. The system of claim 11, wherein the method further comprises sending a recording request to the computing device to record a particular media content item of the one or more media content items.

16. A non-transitory computer-readable storage medium comprising operational instructions that, when executed by the processor, cause the processor to perform a method comprising:
receiving, from a remote control device via a set-top box device a request that media content criteria be obtained from a call-back device via an interactive voice response system, the request including identification information associated with the call-back device;
initiating a call to the call-back device via the interactive voice response system in response to the request;
receiving voice input data via the interactive voice response system, the voice input data received from the call-back device during the initiated call, wherein the voice input data includes the media content criteria;
sending a query to a media content database to identify one or more media content items based at least partially on the media content criteria of the voice input data; and
sending information associated with the one or more media content items to the set-top box device.

17. The non-transitory computer-readable storage medium of claim 16, wherein the media content criteria of the voice input data includes one or more categories associated with video media content, the one or more categories including a genre, an actor, a director, an award, a release date, a title, a channel, a time interval, or a combination thereof.

18. The non-transitory computer-readable storage medium of claim 16, wherein the query is based at least partially on a user profile associated with a user of the call-back device.

19. The non-transitory computer-readable storage medium of claim 16, wherein the method further comprises:
receiving additional information associated with one or more additional media content items identified in history information associated with at least one theme-based chat room session; and
sending the additional information associated with the one or more additional media content items to the set-top box device.

20. The non-transitory computer-readable storage medium of claim 16, wherein the method further comprises sending a channel-change request to the set-top box device to change to a channel that provides a particular media content item of the one or more media content items.

* * * * *

UNITED STATES PATENT AND TRADEMARK OFFICE
CERTIFICATE OF CORRECTION

PATENT NO.            : 8,358,749 B2                                Page 1 of 1
APPLICATION NO.       : 12/623379
DATED                 : January 22, 2013
INVENTOR(S)           : Hisao Chang et al.

It is certified that error appears in the above-identified patent and that said Letters Patent is hereby corrected as shown below:

In the Claims section, Column 12, Claim 3, Lines 50-52, "The implemented method of claim 1, wherein the call-back device is a landline telephone device or a mobile telephone device." should read --The method of claim 1, wherein the call-back device is a landline telephone device or a mobile telephone device.--.

In the Claims section, Column 12, Claim 4, Line 53, "The computer implemented method of claim 1, wherein" should read --The method of claim 1, wherein--.

In the Claims section, Column 13, Claim 10, Line 21, "The comp method of claim 1, wherein the media device" should read --The method of claim 1, wherein the media device--.

In the Claims section, Column 14, Claim 16, Line 18, "device a request that media content criteria be obtained" should read --device, a request that media content criteria be obtained--.

Signed and Sealed this
Eighteenth Day of June, 2013

Teresa Stanek Rea
*Acting Director of the United States Patent and Trademark Office*